Dec. 18, 1934.  R. C. HOWELL ET AL  1,985,169
INDUSTRIAL TRUCK
Filed April 27, 1932  4 Sheets-Sheet 1
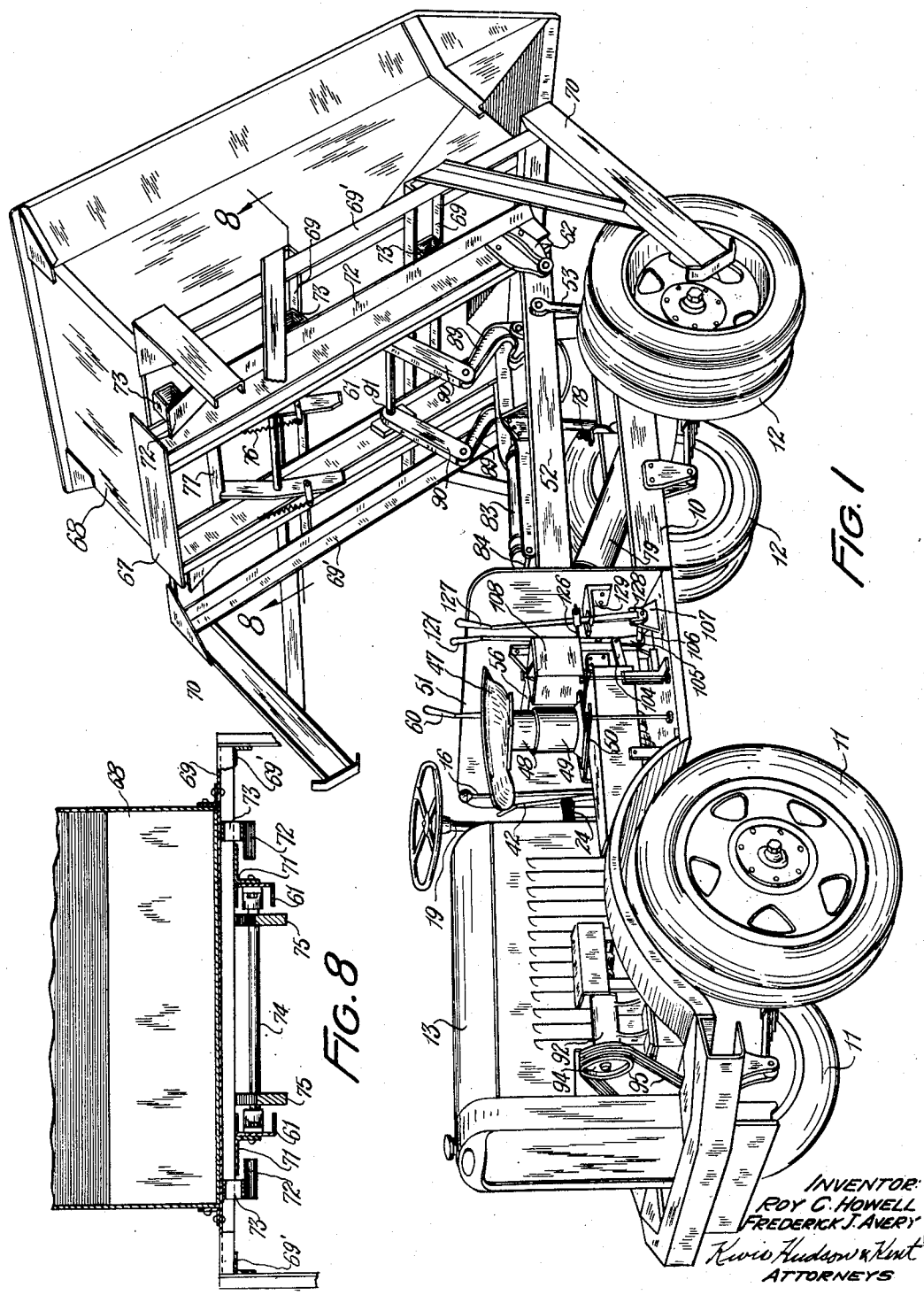

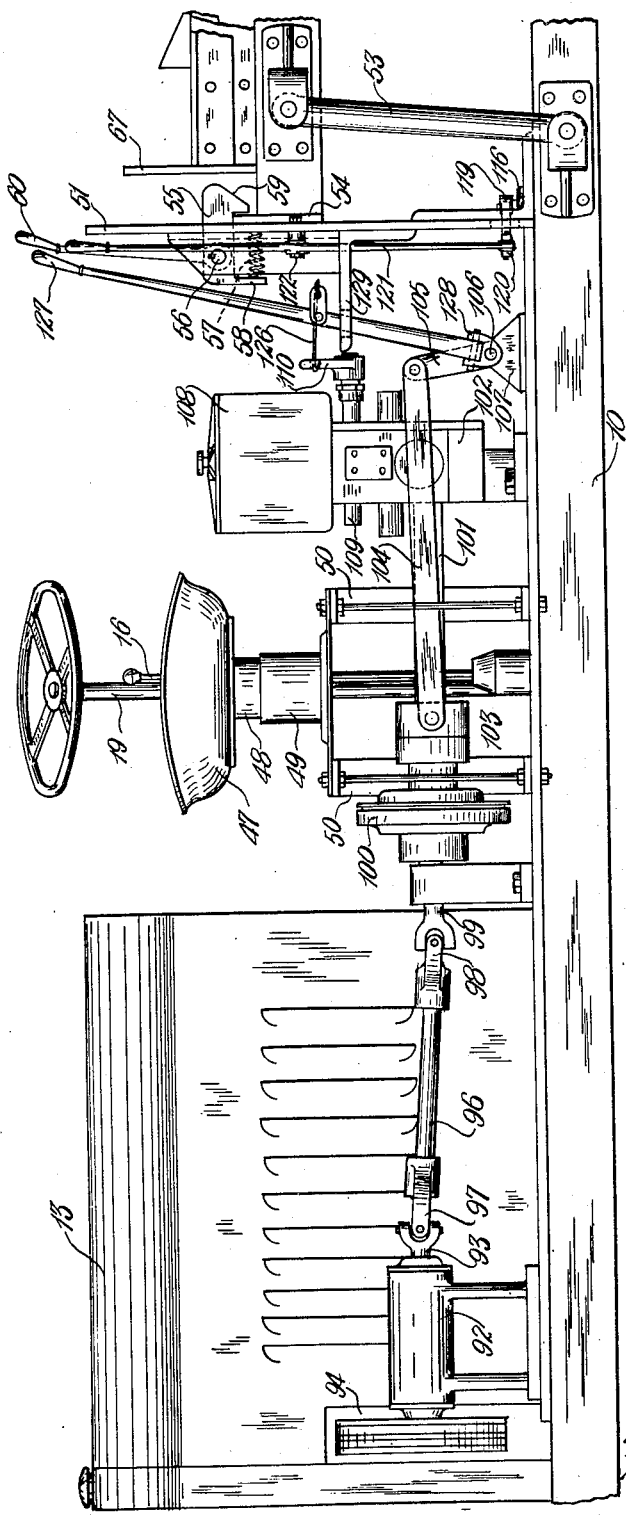

Dec. 18, 1934.   R. C. HOWELL ET AL   1,985,169
INDUSTRIAL TRUCK
Filed April 27, 1932   4 Sheets-Sheet 3
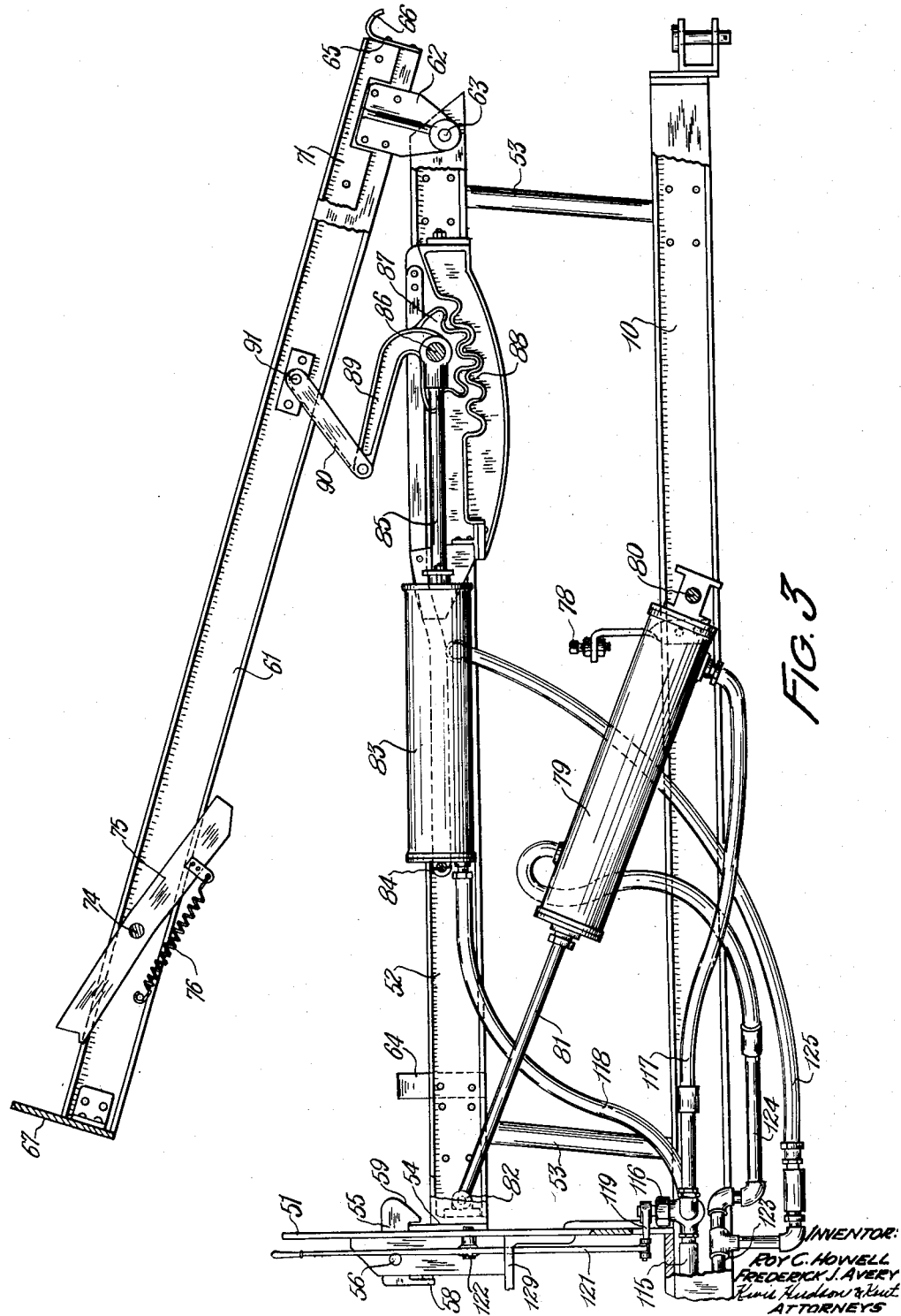

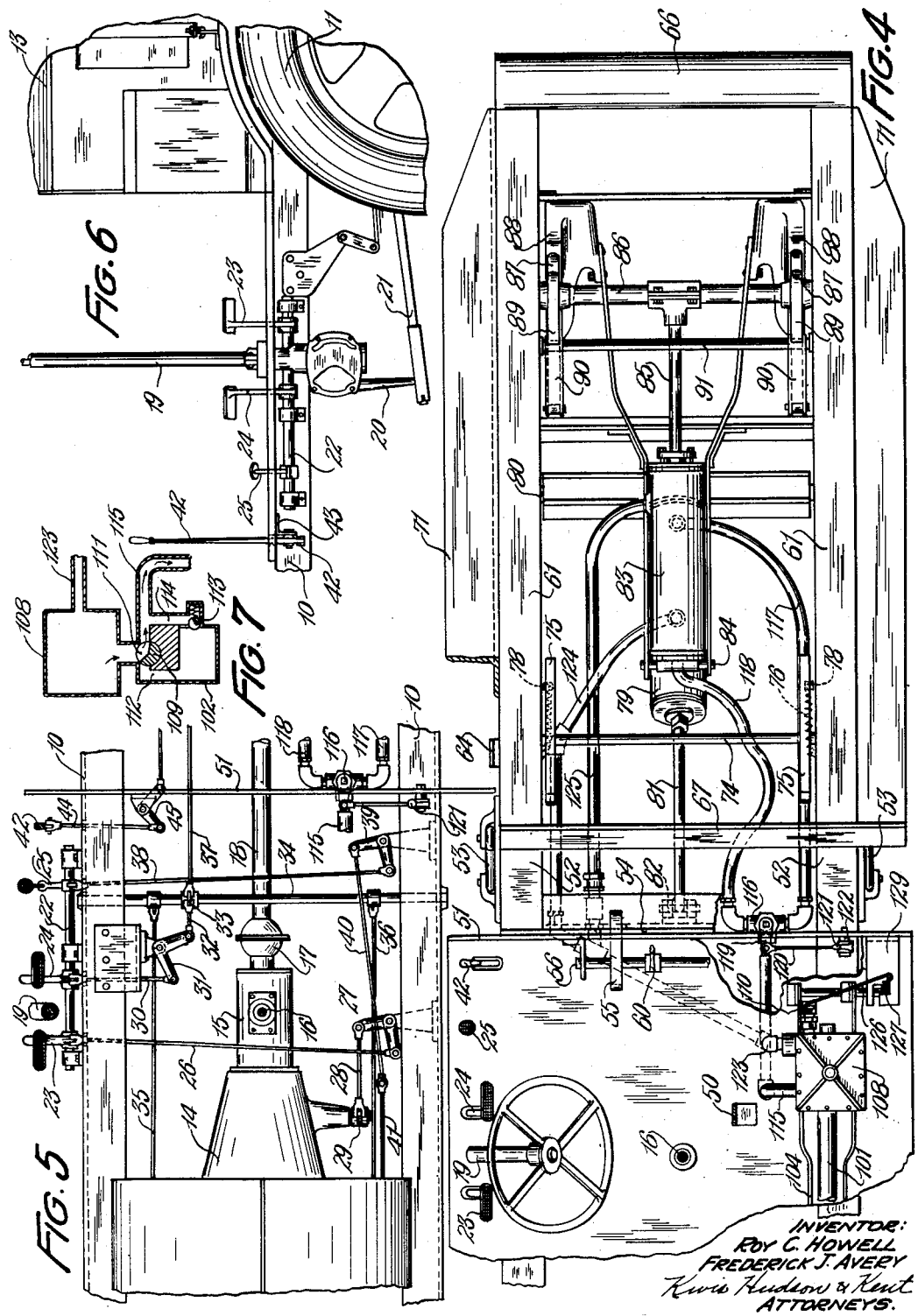

Patented Dec. 18, 1934

1,985,169

UNITED STATES PATENT OFFICE 1,985,169

INDUSTRIAL TRUCK

Roy C. Howell, Lakewood, and Frederick J. Avery, Willoughby, Ohio, assignors to The Howell Industrial Truck Company, Cleveland, Ohio, a corporation of Ohio Application April 27, 1932, Serial No. 607,703

4 Claims. (Cl. 214—65)

This invention relates to improvements in industrial trucks, particularly trucks having dumping mechanism.

One of the objects of the invention is the provision of a truck and load box combination adapted for use in a system wherein a series of load boxes may be positioned wherever desired and loaded as convenient, and wherein a truck having a frame adapted to be driven beneath the load box is employed, having a lift table for raising the load box, after which the truck can be driven to the desired point, the box dumped and returned to its loading station, one truck thereby serving a considerable number of load boxes.

Another object of the invention is the arrangement of the driver's seat and the truck controls so that the driver may look backward as well as forward while operating the truck. This arrangement, in addition to its great convenience where a considerable amount of backing is necessary, is economical of space.

A further object is the arrangement of the gear shift lever and the steering post in transverse alignment, in order that a minimum of space longitudinally of the vehicle may be employed for the control apparatus.

Another object is the provision of automatic latching means for holding the load box in position, which becomes effective just as soon as the load box is lifted off the floor or other support, and which furthermore follows the load box and maintains its engagement therewith whenever the limited relative movement possible between the load box and the dumping frame occurs, as when jerking the box in dumping position to dislodge whatever material tends to adhere to its inner surfaces.

Still another object is the provision of separate actuating mechanism, for the lift table and the dump rack, with a selective single lever control.

Another object is the provision of a power take-off independent of the vehicle propelling mechanism and employed for operating the lift table and dump rack through the intermediacy of a fluid pressure pump connected to the take-off through a clutch, the pump valve and the clutch being controlled by a single operating lever.

Other objects and features of novelty will appear as we proceed with the description of that embodiment of the invention which, for the purposes of the present application, we have illustrated in the accompanying drawings, in which Figure 1 is a perspective view of a complete truck embodying the invention, showing the load box in dumping position.

Fig. 2 is a side elevational view of the forward portion of the truck on a larger scale, certain parts being removed in order to more readily illustrate the invention.

Fig. 3 is a side elevational view of the rear portion of the truck with certain parts broken away and with the load box removed, showing the lift table in its fully raised position.

Fig. 4 is a plan view of the rear portion of the truck and the driver's compartment, the load box being removed.

Fig. 5 is a plan view of the driver's compartment, the floor boards being removed to disclose the control apparatus.

Fig. 6 is a fragmental side elevational view looking in a direction opposite to that of Fig. 2, and illustrating some of the control apparatus.

Fig. 7 is a diagrammatic illustration of the pump, reservoir, and pump valve, and Fig. 8 is a cross sectional view of the dump rack and load box, this view being taken substantially on the line 8—8 of Fig. 1.

Referring to the drawings, the frame of the truck is illustrated at 10. The ground wheels are shown at 11 and 12. In the forward end of the frame an engine (not shown) is mounted in the conventional manner, being concealed in the drawings by a hood 13. The crank shaft of the engine extends longitudinally of the frame substantially midway between the side members thereof, as is the conventional arrangement, and at its rear end is operatively connected with a conventional clutch contained within a clutch housing 14, indicated in Fig. 5. Behind the clutch housing 14 there is a conventional transmission gear box 15 containing change speed transmission gears which are adapted to be controlled in the conventional manner by a gear shift lever 16, also of conventional form. The drive to the rear wheels 12 of the vehicles is through a universal joint 17 and a propeller shaft 18 in the conventional way.

The arrangement of the various controls, other than the gear shift lever, is novel, and is employed partly for the purpose of conserving space longitudinally of the truck and partly for the convenience of the driver, who must do a considerable amount of backing of the truck in the ordinary operation of the same in the system for which the invention is intended. We mount a steering post 19 in transverse alignment with the gear shift lever 16. Below the floor boards of the truck this post is operatively connected with a steering mechanism of any approved type, such as a worm gear and sector, which serves to swing a lever 20 that is connected by the usual ball and socket joint with a link 21 that is operatively connected in the conventional manner with the steering link mechanism for the forward wheels 11.

On the adjacent side member of the frame 10 we secure by suitable means a mounting rod 22 spaced a slight distance from the frame. This rod serves to support several control levers, in this case a clutch lever 23, a brake lever 24, and an accelerator lever 25, these levers being rotatably mounted on the rod 22. From the clutch lever 23 a transverse link 26 extends to the opposite side member of the frame where it is pivotally connected with one arm of a bell crank lever 27, the other arm of which is connected through a link 28 with a crank 29, the movement of which serves to engage or disengage the clutch within the housing 14. The lever 24 operates a link 30 which is connected to one arm of a bell crank lever 31, the other arm of which is connected by a link 32 to a crank 33 upon an oscillatable shaft 34 mounted transversely in the side members of the frame 10. The oscillation of shaft 34 in the proper direction serves to apply the service brakes through means of forwardly extending brake rods 35 and 36 and a rearwardly extending brake rod 37. The accelerator pedal 25 is connected by means of a link 38 with one arm of a bell crank lever 39, the other arm of which is connected by a link 40 with a pull rod 41 running to the carburetor throttle valve. An emergency brake lever 42 is mounted upon a bracket 43 secured to the frame 10, and is connected at its lower end by means of a link 44 to one arm of a bell crank lever 45, the other arm of which is connected to a brake rod 46 by means of which the emergency brakes are operated in any desired or approved manner.

The driver's seat 47 is located on that side of gear shift lever 16 which is opposite to the steering post and other controls, the seat being arranged in transverse alignment with the post 19 and lever 16, so that the driver when seated faces the steering post and other controls and straddles the gear shift lever. The seat may have a spring mounting contained within telescoping cylinders 48 and 49 which is supported upon a framework 50 secured to the frame of the truck or some suitable bracket attached thereto. This framework is open so as to permit some of the mechanism of the truck, later to be referred to, to be located therebeneath.

The movements of the gear shift lever 16 are the same as in the conventional arrangement, but on account of the position of the driver, his movements of the lever in making gear changes will be at right angles to the movements employed where the driver faces the front end of a vehicle. All of the other controls however have identically the same movements as in the conventional automotive vehicle.

The driver's compartment is separated from the rear portion of the truck by means of a transverse vertical partition 51 attached to the frame 10. The lift table, dump rack, and load box are all located to the rear of this partition, and the lift table in its elevated position abuts against the partition. The lift table comprises parallel side rails 52 arranged directly above the side members of frame 10 and connected therewith by links 53, two on each side which, when swung, cause the table rails 52 to move up or down always parallel with the side members of the frame 10 upon which they rest in their lowermost position. Across the forward end of the lift table there is a transverse brace 54 which projects upwardly above the tops of rails 52 and is engaged in the raised position of the lift table by a pair of spring catches 55 that extend through openings in the partition 51 and are keyed to an oscillatable rod 56 supported upon the partition 51 forward of the same. These latches are held in operative position by compression springs 57 bearing at one end upon the partition 51 and at the other end upon depending arms 58 of the latches, the latches having cam surfaces 59 by means of which they are deflected automatically, when the cross brace 65 of the lift table moves against them into engagement with the partition 51, after which the springs 57 cause them to snap into operative position. When the lift table is to be lowered the operator pulls forwardly upon a lever 60 which is also keyed to oscillatable rod 56, thereby lifting the latches against the action of springs 57.

A dump rack 61 is hinged to the side rails 52 of the lift table at the rear end of the latter, brackets 62 being riveted to the dump rack at its rear end and being pivotally connected at 63 with the side rails of the lift table. This dump rack comprises side rails which are in vertical alignment with the side members of frame 10 and with the rails 52 of the lift table. When the dump rack is in lowered position its side rails rest directly on rails 52, and are held at their forward ends against transverse movement by flat bar retainers 64 that are riveted to the outer sides of rails 52 and are flared outwardly to a slight extent above those rails in order to guide the rack into proper position when lowered. The dump rack includes a rear transverse brace 65 which has a downwardly inclined guiding wing 66. There is also a transverse brace 67 at its forward end which projects above the surface of the rack and acts as a stop to limit the forward movement of the load box with respect to the rack.

The load box is shown in Figs. 1 and 8 at 68. It is provided with transverse supporting beams 69 which extend well beyond the sides of the truck. Upon these beams are secured corner angles 69' which, together with the beams, support legs 70. The latter are spaced apart transversely far enough to enable the truck to be backed under the load box when it is supported upon the ground by the legs. To the side rails of the dump rack 61 we rivet angle irons 71 which extend practically the entire length of the dump rack and have horizontal flanges which constitute guiding and retaining means for the load box. At their rear ends these flanges are beveled off as shown in Fig. 4, and these beveled portions, together with the downwardly inclined wing 66 of the brace at the rear end of the dump rack, constitute means for centering the rack with respect to a load box when the truck is backed into position beneath such box. In order to cooperate with the flanges on the guides 71 we mount longitudinal guide rails 72 on the beams 69 but spaced below the same by means of spacers 73. The flanges on the angles 71 overlap the guide rails 72, as indicated in Fig. 8, there being a vertical clearance between the rails 72 and the beams 69 sufficient to accommodate the flanges of the rails 71 for average operation despite inequalities of floor or ground surfaces.

On the rod 74, mounted transversely in the dump rack near the forward end thereof, we mount rotatably a pair of latch bars 75, the forward ends of which are urged upwardly by coil springs 76. The forward ends of these bars are shaped to engage a transverse brace 77 on the load box 68, as shown in Fig. 1, and the bars, because of the bias given to them by the springs 76, maintain their engagement with the brace 77 throughout whatever slight relative movement there may be between the load box and the dump rack within the aforesaid clearance, in a direction at right angles to the rack. The engagement of the latch bars 75 with the load box is therefore maintained in all positions of the dump rack and lift table except when the dump rack is down in engagement with the lift table and the latter is caused to swing down to its lowered position, whereupon the rear ends of the latch bars 75 come into engagement with adjustable stops 78 attached to the inner surfaces of the side members of the frame 10. The bars 75 are thereby swung upon the rod 74 in such manner as to withdraw the latches from engagement with the brace 77. At such time therefore there is nothing to prevent the truck from being driven forward, leaving the load box supported upon its legs 70.

The lift table is preferably arranged to be swung to its raised position by means of a hydraulic actuating mechanism. This may comprise a cylinder 79, mounted at one end to swing upon a rod 80 that forms a transverse brace for the frame 10. The piston within the cylinder 79 has a piston rod 81 which is pivotally connected at 82 with the forward brace 54 of the lift table. We preferably use hydraulic means also for swinging the dump rack to and from dumping position, and this means may comprise a cylinder 83 pivotally mounted upon a cross rod 84 of the lift table, the piston rod 85 being rotatably mounted at its rear end upon a shaft 86 to which are keyed a pair of gear segments 87 that run in racks 88 rigidly mounted in the lift table. Integral with the sectors 87 are arms 89, to the outer extremities of which are connected links 90 that are pivotally connected at 91 with the dump rack. It will be obvious that as the piston rod 85 travels outwardly the gear sectors 87 will run upon the racks 88 and have imparted to them a rotative motion about the axis of shaft 86, which will cause the arms 89 to swing toward the right, as viewed in Figs. 1 and 3, thereby swinging the dump rack 61 upwardly about its pivot 63.

Power for operating the hydraulic actuating mechanism for the lift table and dump rack is taken from the truck engine entirely independently of the truck propelling mechanism. For this purpose we mount at the forward end of the frame to one side of the hood 13 a heavy bracket 92 providing bearings for a short shaft 93 which carries a pulley 94 at its forward extremity. The pulley is connected by means of a belt 95 with a pulley (not shown) on the forward end of the engine crank shaft. A shaft 96 works through universal joints 97 and 98 to drive a shaft 99 that is mounted in rigid bearings carried by the frame 10. The shaft 99 is connected through a clutch 100 of any suitable character with an aligned shaft 101, also mounted in rigid bearings, and constituting the drive shaft for a liquid pump 102. The clutch 100 is controlled by a collar 103 that is adapted to be moved by a link 104 which is connected to the upper end of crank 105 keyed to shaft 106 mounted in brackets 107 attached to the frame of the truck. Above the pump 102 there is mounted a reservoir 108 in which is maintained a supply of oil or other liquid used in the hydraulic mechanism.

The details of the pump per se form no part of the present invention, but the control of the pump enters into the invention in some of its aspects, and we have therefore shown in Fig. 7 diagrammatically, the pump, the reservoir and the control valve. 109 is a valve control shaft which extends through the pump housing and is provided outside the housing with a crank 110 by means of which it may be oscillated. Within the housing the shaft 109 is cut away to form a port 111. When the shaft is in the proper position this port 111 connects the reservoir 108 with a passage 112 leading to the pump. At such time the pump forces liquid through a check valve 113, through a passage 114 into a main pressure supply conductor 115. When the valve shaft 109 is in the position indicated in Fig. 7, liquid supply to the pump is cut off and liquid is free to return through conductor 115 and port 111 to reservoir 108, the pump being, in effect, short-circuited.

Referring now to Fig. 4, the main conductor 115 leads to a three-way valve 116 from which branch conductors 117 and 118 lead to the cylinders 79 and 83 respectively. The valve 116 has an operating crank 119 which extends forward through an opening in the partition 51 and is connected by a link 120 to the lower end of a control lever 121 which is pivoted at 122 to the partition 51. To the reservoir 108 there is connected a conductor 123 from which extend flexible conductors 124 and 125 that run to the cylinders 79 and 83 respectively and are connected with the latter at points remote from the connections of the branch conductors 117 and 118 respectively. The crank 110 on the valve shaft 109 is connected by means of a link 126 with a hand lever 127, the lower end of which is pivotally mounted in a yoke 128 that is secured upon oscillating shaft 106. Lever 127 is adapted to enter a bayonet slot in a keeper plate 129. This is the same lever which operates the clutch 100 through crank 105, link 104 and collar 103. It is shown in the drawings in its clutch disengaging position, being held there against the action of the clutch spring by the bayonet slot in plate 129. In order to disengage the clutch the operator must first move the lever 127 transversely about its pivot in yoke 128, after which it is free to be moved forward out of the slot into clutch engaging position. The transverse movement of the lever imparts oscillation to the valve shaft 109 through the link 126, causing that shaft to move from the position illustrated in Fig. 7 to a position in which the port 111 connects the reservoir with the passage 112. In other words it opens the pump supply valve and cuts off return flow from the conductor 115 to the reservoir.

Assuming that both the lift table and the dump rack are in their lowered positions, and that the operator desires to first raise the lift table and then swing the dump rack to dumping position, he operates lever 121 to set the three-way valve 116 into such position as to connect the main conductor 115 with the branch conductor 117. He then grasps lever 127, pushes it transversely, thereby oscillating valve shaft 109, to connect the reservoir 108 with the pump 102, and then shifts the lever 127 forward to cause engagement of the elements of clutch 100. The pump then begins to operate and liquid is drawn from reservoir 108 and forced through check valve 113, passage 114 and conductor 115 and thence through valve 116 to branch conductor 117. It then enters cylinder 79 and causes the piston to travel forwardly, whereby the pivot 82 on the lift table is forced upwardly and forwardly by the piston rod 81.

As soon as the latch bars 75 leave the adjustable stops 78 the springs 76 cause the latch bars to move into engaging relation with the brace 77 on the load box. As the piston advances the liquid in front of it is driven through conductors 124 and 123 back into the reservoir. The point of connection of the conductor 124 with the cylinder 79 is so chosen that the piston will pass that point of connection just at the time that the lift table has reached its uppermost position and been automatically retained by the spring catches 55. Hence the continued action of the pump after that time can do no harm as the pressure fluid will merely enter the cylinder from the conductor 117 and leave the cylinder through conductor 124, flowing back to the reservoir.

After the lift table is in its uppermost position the operator will pull back upon lever 127 disengaging the clutch 100 and stopping the pump and will cause the lever to enter the bayonet slot in plate 129, after which it will be pulled to the rear of that slot and then moved transversely, whereby the link 126 is caused to operate the valve shaft 109 to move the port 111 back to the position illustrated in Fig. 7. With the lift table in its upper position the truck may be driven to the desired point, after which the dump rack will be swung upward to dumping position.

To effect the movement of the dump rack to dumping position, the driver first moves lever 121 to manipulate valve 116 so as to connect main conductor 115 with branch conductor 118. He then moves lever 127 to throw valve shaft 109 to a position opposite to that indicated in Fig. 7 and to engage the clutch. Liquid then flows under pressure through branch conductor 118 into the forward end of cylinder 83, forcing the piston in that cylinder and its rod 85 rearwardly. The sector 27 is thereby caused to travel over the rack 88, and the shaft 86 with the arms 89 are swung about the axis of shaft 86, causing the links 90 to swing the dump rack upwardly about its pivot 63. The liquid in the cylinder in front of the piston is then carried back to the reservoir through the conductors 125 and 123. As soon as the piston passes the point of connection of conductor 125 with cylinder 83 the upward movement of the dump rack about its pivot ceases, as a continuing operation of the pump merely causes liquid to flow into the forward end of the cylinder and out through conductor 125. The weight of the dump rack and load box with its contents however tends to reverse the piston movement, and as a result it comes to rest opposite the point of connection of the conductor 125. The valve shaft 109 prevents the weight of the load from pushing the pressure fluid out of the forward end of the cylinder and through the conductors 118 and 115 back to the reservoir. The dump rack 61 is therefore held in the dumping position by this means. Now, should any of the contents of the load box tend to adhere to the inner surfaces of the box, the operator may impart a jerking or snapping action to the dump rack by alternately engaging and disengaging the elements of clutch 100, which he can do by manipulation of the lever 127.

Now, assuming that the load has been dumped, the operator causes the dump rack 61 to descend by moving the lever 127 into the position indicated in the drawings, which places the valve shaft 109 in the position indicated in Fig. 7, thereby permitting the liquid in cylinder 83 in front of its piston to return to the reservoir through branch conductor 118 and main conductor 115. The excess liquid within the reservoir may then flow back through conductors 123 and 125 into the cylinder 83 behind the piston.

The truck may now be driven back to the loading station for that particular load box, and when it is properly positioned the operator moves three-way valve 116 into position to connect conductor 117, with conductor 115. He then moves operating lever 60 forward to retract the latches 55, after which the weight of the lift table and of the load box swings the lift table downwardly on its links 53, causing the piston in cylinder 79 to move the liquid out of the rear end of that cylinder through conductors 117, 115 back to the reservoir, and causing liquid to return from the forward end of the cylinder 79 to the reservoir, through conductors 123 and 124. By manipulation of the valve shaft 109 the rate of this flow may be controlled and thereby the rate of descent of the lift table may be regulated.

In the foregoing description we have necessarily gone somewhat into detail in order to explain fully the particular embodiments of the invention herein illustrated, but we desire it to be understood that such detailed disclosures are not to be construed as amounting to limitations, except as they may be included in the appended claims.

Having thus described our invention, we claim:

1. In an automotive vehicle, a frame, a load box separable from said frame, a lift table mounted in the frame, means for raising said table with said load box supported thereupon, interengaging longitudinal guides upon said lift table and said box for preventing relative lateral movement, said guides permitting relative longitudinal movement between the box and lift table, a stop for limiting the forward movement of the box with respect to the table, a latch associated with the table for holding said box against movement rearwardly, and means operative automatically as said table rises away from said frame for setting said latch.

2. In a dump wagon, a frame, a dump rack pivotally connected at its rear end to the frame, a load box mounted on said rack, the mounting of said box permitting slight movement thereof away from the rack, a latch near the forward end of the rack for preventing rearward movement of the box upon the rack, said latch being yieldable in a direction at right angles to the rack, whereby a sudden movement of the rack about its pivots when in dumping position will cause the box to move with a jerk a limited distance away from the rack thereby loosening material which may tend to adhere to the surface of the box.

3. In a vehicle, a frame, a lift table thereon, a dump rack pivotally connected with said table, means for raising said table comprising a cylinder and piston, means for swinging said rack to dumping position comprising a cylinder and piston, means for supplying pressure fluid to said cylinders, and a single control means for directing said fluid to either of said cylinders selectively.

4. In a vehicle, a frame, a lift table thereon, a dump rack pivotally connected with said table, means for raising said table comprising a cylinder and piston, means for swinging said rack to dumping position comprising a cylinder and piston, means for supplying pressure fluid to said cylinders comprising a main conductor, two branch conductors extending therefrom to the respective cylinders, and a three-way valve at the intersection of said main and branch conductors for directing pressure fluid to either of said branch conductors selectively.

ROY C. HOWELL.
FREDERICK J. AVERY.